US010116661B2

(12) United States Patent
Wang et al.

(10) Patent No.: US 10,116,661 B2
(45) Date of Patent: Oct. 30, 2018

(54) METHOD AND SYSTEM FOR CLASSIFYING NETWORK REQUESTS

(71) Applicant: Yahoo Holdings, Inc., Sunnyvale, CA (US)

(72) Inventors: Phil Wang, Sunnyvale, CA (US); Ravikiran Meka, Bangalore (IN)

(73) Assignee: Oath Inc., New York, NY (US)

(*) Notice: Subject to any disclaimer, the term of this patent is extended or adjusted under 35 U.S.C. 154(b) by 0 days.

(21) Appl. No.: 15/391,716

(22) Filed: Dec. 27, 2016

(65) Prior Publication Data
US 2018/0183798 A1      Jun. 28, 2018

(51) Int. Cl.
H04L 29/06       (2006.01)
H04L 29/08       (2006.01)
H04L 29/12       (2006.01)

(52) U.S. Cl.
CPC ........ H04L 63/101 (2013.01); H04L 61/2007 (2013.01); H04L 63/08 (2013.01); H04L 67/02 (2013.01); H04L 67/146 (2013.01); H04L 2463/121 (2013.01)

(58) Field of Classification Search
None
See application file for complete search history.

(56) References Cited

U.S. PATENT DOCUMENTS

| | | | |
|---|---|---|---|
| 9,369,431 B1* | 6/2016 | Kirby | H04L 63/02 |
| 9,661,266 B2* | 5/2017 | Inoue | H04N 7/147 |
| 9,729,509 B2* | 8/2017 | Jain | H04L 63/0245 |
| 2005/0004968 A1* | 1/2005 | Mononen | H04L 63/0823 |
| | | | 709/200 |
| 2005/0169288 A1* | 8/2005 | Kamiwada | H04L 29/12009 |
| | | | 370/401 |
| 2006/0015615 A1* | 1/2006 | Merle | H04L 63/0428 |
| | | | 709/225 |
| 2009/0157675 A1* | 6/2009 | Stellhorn | G06Q 10/107 |
| 2010/0042615 A1* | 2/2010 | Rinearson | G06F 17/30867 |
| | | | 707/708 |
| 2010/0088408 A1* | 4/2010 | Asai | G06F 11/3013 |
| | | | 709/224 |
| 2010/0088505 A1* | 4/2010 | Coppola | H04L 63/0428 |
| | | | 713/153 |
| 2010/0157848 A1* | 6/2010 | Das | H04W 64/00 |
| | | | 370/254 |
| 2011/0142035 A1* | 6/2011 | Ku | H04L 63/0853 |
| | | | 370/352 |
| 2013/0254343 A1* | 9/2013 | Stevens | H04L 63/20 |
| | | | 709/219 |
| 2014/0164616 A1* | 6/2014 | Pinto | H04L 65/103 |
| | | | 709/225 |
| 2015/0100689 A1* | 4/2015 | Cooke | H04W 24/08 |
| | | | 709/224 |
| 2015/0135253 A1* | 5/2015 | Angel | H04L 63/0227 |
| | | | 726/1 |

* cited by examiner

*Primary Examiner* — Benjamin E Lanier
(74) *Attorney, Agent, or Firm* — Pillsbury Winthrop Shaw Pittman LLP

(57) ABSTRACT

Methods, systems and programming for classifying network requests. In one example, a network request for content to be fetched by a content server is received from a client device. At least one non-internet protocol (IP) key is obtained based on the network request. Whether to deny or allow the network request is determined based on the at least one non-IP key.

18 Claims, 15 Drawing Sheets

METHOD AND SYSTEM FOR CLASSIFYING NETWORK REQUESTS

BACKGROUND

1. Technical Field

The present teaching relates to methods, systems, and programming for Internet services. Particularly, the present teaching is directed to methods, systems, and programming for classifying network requests.

2. Discussion of Technical Background

A traffic service request handler, e.g., Yahoo!'s Blackbird product, is an important component in computer network to ensure real-time network security. The traffic service request handler may be used to classify network requests for content from client devices. Specifically, the traffic service request handler may determine a portion of the network requests to be potential threats to the network security and thus deny the portion of the network requests. Alternatively, the traffic service request handler may determine the rest of the network requests to be safe to the network and thus allow the rest of the network requests. Two typical classifiers used in the traffic service request handler may be referred to as a blacklist classifier and a whitelist classifier. The blacklist classifier may be used to determine whether a network request is to be denied based on whether one or more data items (i.e., keys) associated with the network request satisfy a predetermined blacklist rule. On the other hand, the whitelist classifier may be used to determine whether the network request is to be allowed based on whether the one or more data items (i.e., the keys) associated with the network request satisfy a predetermined whitelist rule.

The existing techniques of implementing the blacklist classifier and the whitelist classifier for classifying network requests are performed based solely on internet protocol (IP) addresses. Each blacklist rule or whitelist rule may identify an IP address or a range of IP addresses. Accordingly, the blacklist classifier may determine the network request is to be denied when the IP address associated with the network request satisfies a blacklist rule, e.g., matching an IP address identified in the blacklist rule, not matching the IP address identified in the blacklist rule, falling within a range of IP addresses identified in the blacklist rule, or falling out of the range of IP addresses identified in the blacklist rule. On the other hand, the whitelist classifier may determine the network request is to be allowed when the IP address associated with the network request satisfies a whitelist rule, e.g., matching an IP address identified in the whitelist rule, not matching the IP address identified in the whitelist rule, falling within a range of IP addresses identified in the whitelist rule, or falling out of the range of IP addresses identified in the whitelist rule.

However, in some examples, the existing techniques as described above are not always effective. For example, the existing blacklist classifier may deny all network requests associated with an IP address identified by the blacklist rule. This is helpful to protect network from potential attack by malicious software installed in a client device associated with the IP address. However, this also prevents users from using the client device for normal operations, e.g., surfing the internet through the internet browser installed in the client device associated with the IP address. For another example, the existing whitelist classifier may allow all network requests associated with the IP address identified by the whitelist rule. However, this may be ineffective to protect the network when malicious software is unintentionally installed in the client device associated with the IP address and transmits harmful network requests through the client device.

Therefore, there is a need to provide an improved solution for classifying network requests to solve the above-mentioned problems.

SUMMARY

The present teaching relates to methods, systems, and programming for Internet services. Particularly, the present teaching is directed to methods, systems, and programming for classifying network requests.

In one example, a method, implemented on at least one machine each having at least one processor, storage, and a communication platform connected to a network for classifying network requests, is presented. A network request for content to be fetched by a content server is received from a client device. At least one non-internet protocol (IP) key is obtained based on the network request. Whether to deny or allow the network request is determined based on the at least one non-IP key.

In another example, a system having at least one processor, storage, and a communication platform for classifying network requests is presented. The system includes an initializer and a matcher. The initializer is configured to receive, from a client device, a network request for content to be fetched by a content server. The matcher is configured to obtain at least one non-IP key based on the network request, and determine whether to deny or allow the network request based on the at least one non-IP key.

Other concepts relate to software for classifying network requests. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for classifying network requests is presented. The recorded information, when read by the machine, causes the machine to perform the following. A network request for content to be fetched by a content server is received from a client device. At least one non-internet protocol (IP) key is obtained based on the network request. Whether to deny or allow the network request is determined based on the at least one non-IP key.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of classifying network requests. The method and system as disclosed herein aim at effectively protecting real-time Internet traffic by classifying the network requests based on at least one IP key and/or at least one non-IP key. Specifically, the at least one non-IP key may include, but is not limited to a uniform resource identifier (URI) key, a user key, a hypertext transfer protocol (HTTP) key, a location key, and a cookie key. As will be described below, a dynamic classifier is disclosed to achieve this goal. The dynamic classifier may be configured as either a blacklist classifier or a whitelist classifier upon receipt of a startup signal at runtime configuration. When the dynamic classifier is configured as the blacklist classifier, the dynamic classifier is used to determine whether a network request is to be denied based on whether the at least one non-IP key and/or the at least one IP key satisfy at least one of the blacklist rules. Alternatively, when the dynamic classifier is configured as the whitelist classifier, the dynamic classifier is used to determine whether the network request is to be allowed based on whether the at least one non-IP key and/or the at least one IP key satisfy at least one of the whitelist rules. In an embodiment, the blacklist rules and the whitelist rules have the same configuration and data format.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
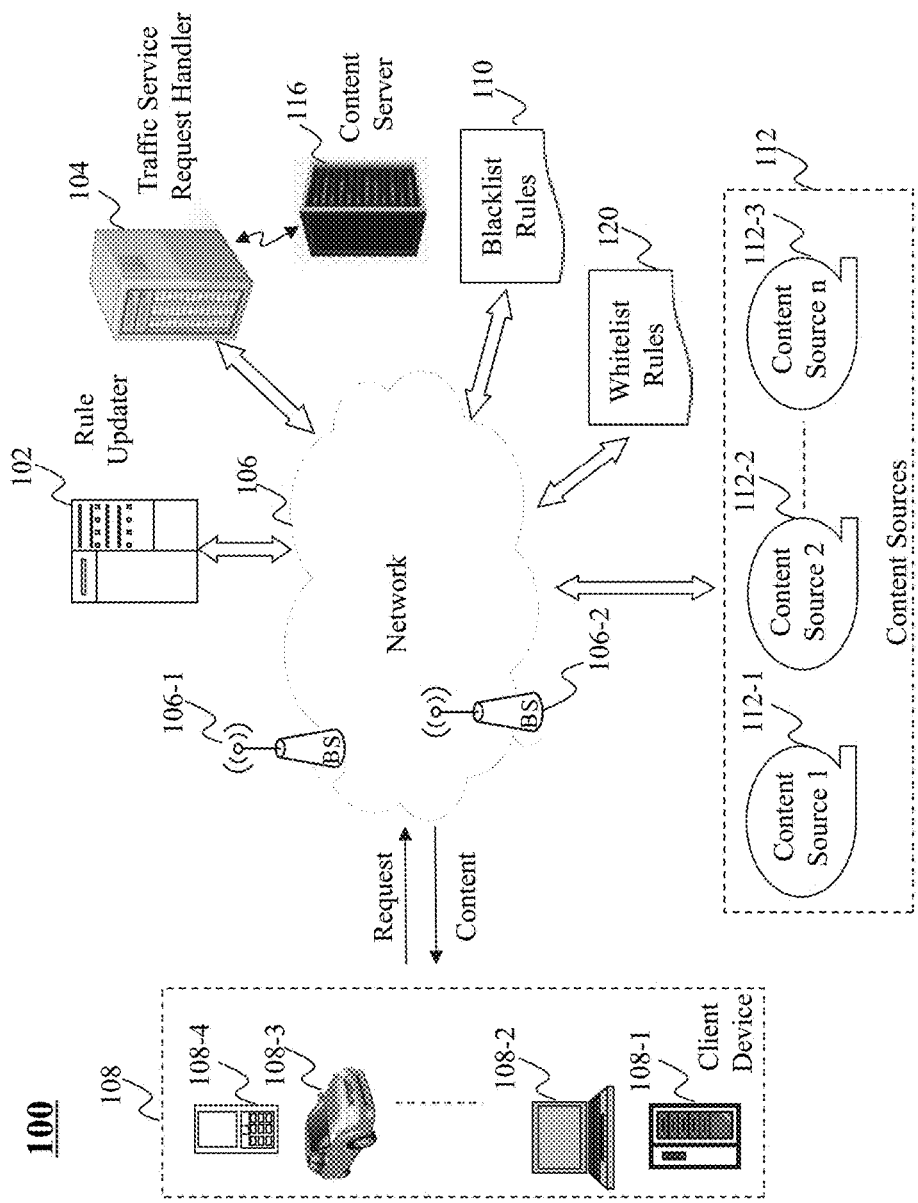
FIG. 1 is a high level depiction of an exemplary system for providing content in response to a network request, according to an embodiment of the present teaching.

FIG. 1 is a high level depiction of an exemplary system 100 for providing content in response to a network request, according to an embodiment of the present teaching. In FIG. 1, the exemplary system 100 includes a rule updater 102, a traffic service request handler 104, a content server 116, one or more client devices 108, a network 106, content sources 112, a set of blacklist rules 110, and a set of whitelist rules 120. The network 106 may be a single network or a combination of different networks. For example, the network 106 may be a local area network (LAN), a wide area network (WAN), a public network, a private network, a proprietary network, a Public Telephone Switched Network (PSTN), the Internet, a wireless network, a virtual network, or any combination thereof. The network 106 may also include various network access points, e.g., wired or wireless access points such as base stations or Internet exchange points 106-1 . . . 106-2, through which a data source may connect to the network 106 in order to transmit information via the network 106.

Client devices 108 may be of different types connected to the network 106. For example, the client devices 108 may include, but are not limited to, desktop computers 108-1, laptop computers 108-2, a built-in device in a motor vehicle 108-3, and/or a mobile device 108-4.

A client device 108 may transmit a network request for content to the traffic service request handler 104 via the network 106. The network request may be associated with one or more Non-IP keys and/or IP keys (more details will be illustrated in FIG. 4). The content may include, but is not limited to, an audio file, a text document, an image, and/or a video file. The traffic service request handler 104 may classify the network request, i.e., determine whether to deny or to allow the network request for the content based on the one or more non-IP keys and/or IP keys associated with the network request according to the blacklist rules 110 and the whitelist rules 120. Each of the blacklist rules 110 and the whitelist rules 120 may identify one or more acceptable or unacceptable values or regular expressions for non-IP keys and/or IP keys. Alternatively or in addition, each of the blacklist rules 110 and the whitelist rules 120 may identify one or more acceptable or unacceptable ranges of Non-IP keys and/or IP keys. The traffic service request handler 104 may determine the network request to be denied when the one or more Non-IP keys and/or IP keys satisfy any one of the blacklist rules 110. On the other hand, the traffic service request handler 104 may determine the network request to be allowed when the one or more Non-IP keys and/or IP keys satisfy any one of the whitelist rules 120. In an embodiment, the blacklist rules 110 and the whitelist rules 120 may be updated periodically or aperiodically by the rule updater 102. More details about the rule updater 102 will be described in FIGS. 12-13 and associated text below.

When it is determined to allow the network request, the traffic service request handler 104 may instruct the content server 116 to probe the content sources 112 for the requested content and transmitted the requested content to the client device 108 through the network 106. The content sources 112 include multiple content sources 112-1, 112-2 . . . 112-3, such as vertical content sources. A content source 112 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The content server 116 may access information from any of the content sources 112-1, 112-2 . . . 112-3.

Figure 2:
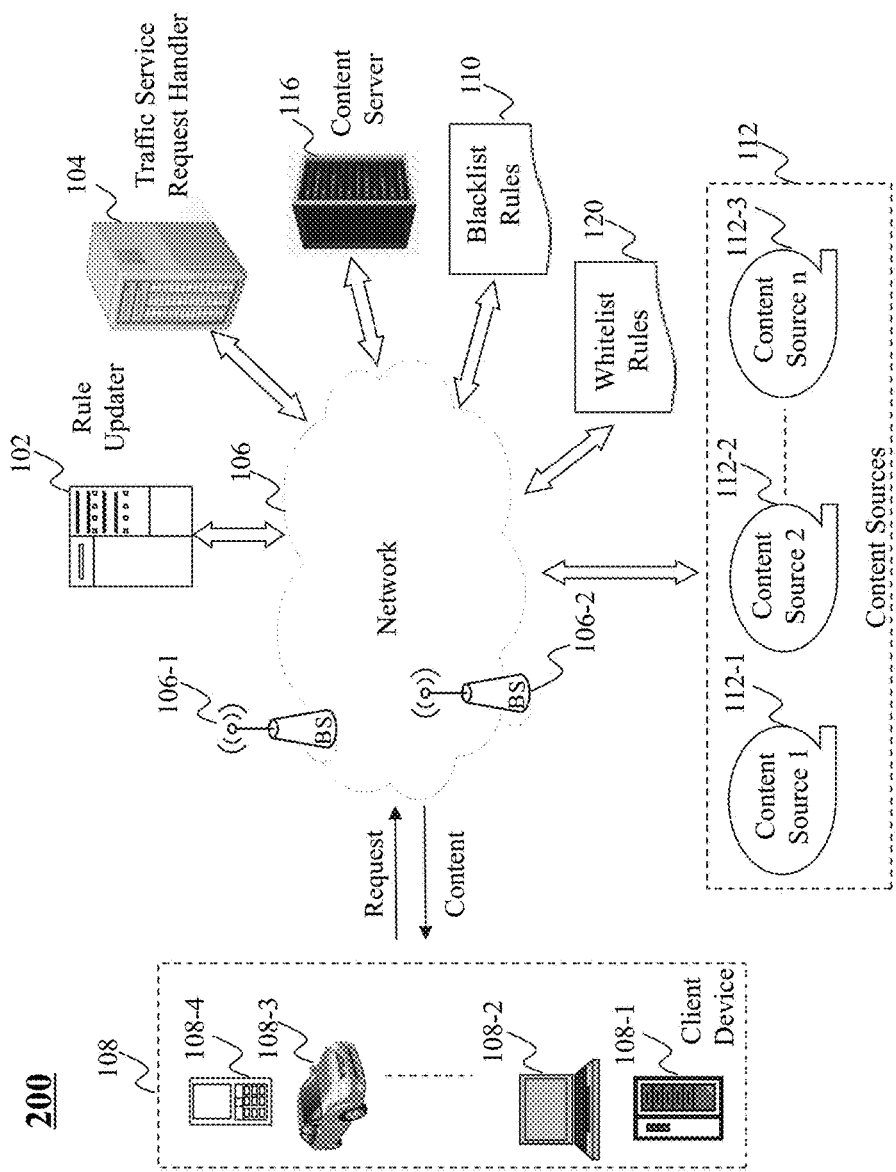
FIG. 2 is a high level depiction of an exemplary system for providing content in response to a network request, according to an embodiment of the present teaching.

FIG. 2 is a high level depiction of an exemplary system 200 for providing content in response to a network request, according to an embodiment of the present teaching. The exemplary system 200 in FIG. 2 is similar to the exemplary system 100 in FIG. 1, except that the content server 116 in FIG. 2 directly connects to the network 106. In this example, the content server 116 may not operate unless instructed by the traffic service request handler 104 after the network request is classified. The exemplary system 200 in FIG. 2 may be particular useful when the content server 116 needs to be in communication with a plurality of traffic service request handler 104 at the same time via the network 106.

Figure 3:
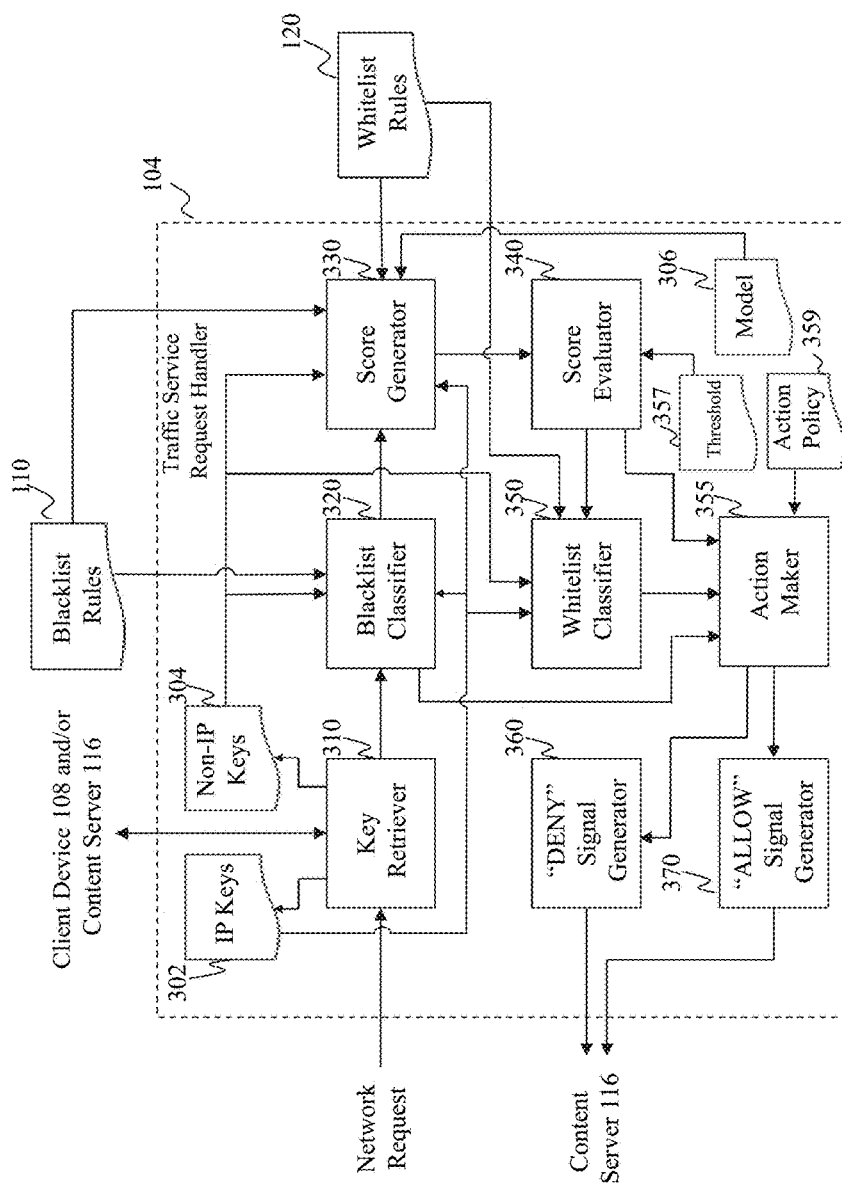
FIG. 3 illustrates an exemplary diagram of a traffic service request handler, according to an embodiment of the present teaching.

FIG. 3 illustrates an exemplary diagram of the traffic service request handler 104 as shown in FIGS. 1-2, according to an embodiment of the present teaching. The traffic service request handler 104 in this example includes a key retriever 310, one or more IP keys 302, one or more non-IP keys 304, a blacklist classifier 320, a score generator 330, a score evaluator 340, a whitelist classifier 350, a "DENY" signal generator 360, an "ALLOW" signal generator 370, an action maker 355, a threshold 357, an action policy 359, and a model 306.

The key retriever 360 receives a network request from a client device 108 through the network 106. The key retriever 360 further retrieves one or more non-IP keys 304 and/or IP keys 302 associated with the network request. The one or more IP keys 302 may include any IP address associated with the network request. The one or more non-IP key 304 may include any data item associated with the network request that is other than IP address.

Figure 4:
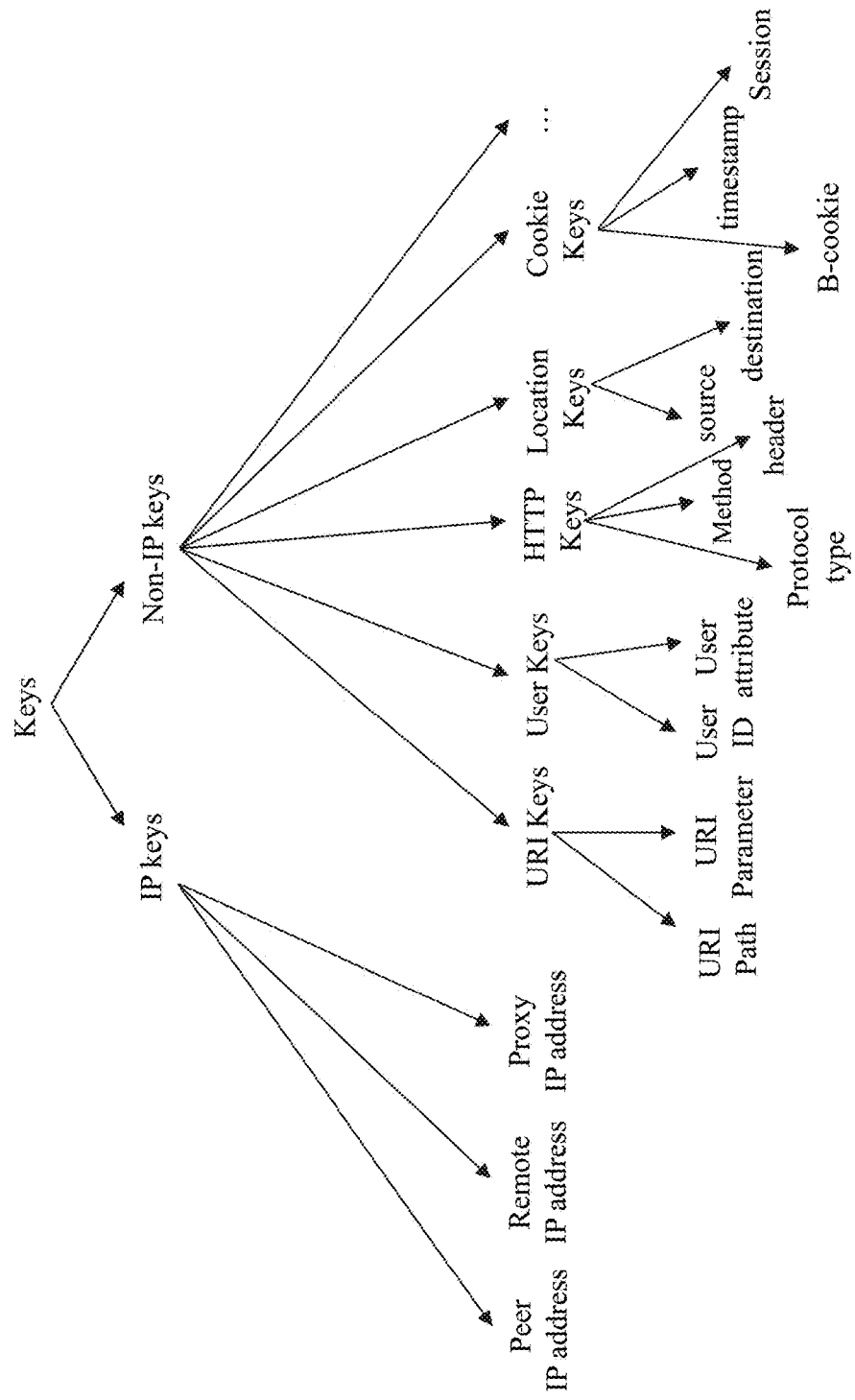
FIG. 4 illustrates exemplary examples of keys, according to an embodiment of the present teaching.

FIG. 4 illustrates exemplary examples of keys associated with the network request, according to an embodiment of the present teaching. As shown, the keys may include IP keys and non-IP keys. The IP keys may include, but are not limited to, one or more selected from a peer IP address, a remote IP address, and a proxy IP address. The non-IP keys may include, but are not limited to, one or more selected from a URI key, a user key, an HTTP key, a location key, and a cookie key. Specifically, the URI key may be a URI path (e.g., "/oauth/v1/private") or a URI parameter (e.g., "/?session=x1b2e3s2"). The user key may be a user identifier (ID) or a user attribute. The HTTP key may be a protocol type, a HTTP method (e.g., "GET," "POST," etc.), or a HTTP header (e.g., "user-agent," "host," etc.). The location key may be indicative of a location of a source or a destination. The cookie key may be a b-cookie, a timestamp cookie, or a session cookie (e.g., "login").

Returning to FIG. 3, the blacklist classifier 320 determines whether the network request is to be denied according to the blacklist rules. Specifically, when the retrieved one or more IP keys and/or non-IP keys associated with the network request satisfy any one of the blacklist rules, it is determined that the network request is to be denied, and thus the action maker 355 is to be informed. Otherwise, the blacklist classifier 320 instructs to operate the score generator 330.

The score generator 330 calculates a score indicative of likelihood to deny the network request based on the model 306, the blacklist rules 110 and the whitelist rules 120. The score evaluator 340 determines whether the score is greater than the threshold 357. If so, the score evaluator 340 instructs the whitelist classifier 350 to operate. Otherwise, it is determined the network request is to be allowed and thus the action maker 355 is to be informed.

The whitelist classifier 350 determines whether the network request is to be allowed according to the whitelist rules. Specifically, when the retrieved one or more IP keys and/or non-IP keys associated with the network request satisfy any one of the whitelist rules, it is determined that the network request is to be allowed. Otherwise, it is determined the network request is to be denied. In either case, the action maker 355 is to be informed.

The action maker 355 instructs the "DENY" signal generator 360 or the "ALLOW" signal generator 370 to generate the appropriate classification result according to the action policy 359. Specifically, the action maker 355 instructs the "DENY" signal generator 360 to generate a "DENY" signal to the content server 116 if the action maker 355 receives the instruction from the blacklist classifier 320 (i.e., when the retrieved one or more IP keys and/or non-IP keys satisfy any one of the blacklist rules 110), or if the action maker 355 receives the instruction from the whitelist classifier 350 and the retrieved one or more IP key and/or the non-IP key do not satisfy any one of the whitelist rules 120. Alternatively, the action maker 355 instructs the "ALLOW" signal generator 370 to generate an "ALLOW" signal to the content server 116 if the action maker 355 receives the instruction from the whitelist classifier 350 and the retrieved one or more IP keys and/or non-IP keys satisfy any one of the whitelist rules 120, or if the action maker 355 receives the instruction from the score evaluator 340 (i.e., when the score evaluator 340 determines the calculated score is no greater than the threshold 357.)

The "DENY" signal generator 360 and the "ALLOW" signal generator 370 generate the "DENY" signal and the "ALLOW" signal according to the action maker 355, and transmit the "DENY" signal and the "ALLOW" signal to the content server 116, respectively.

As described above, each of the blacklist rules and the whitelist rules may be associated with one or more Non-IP keys and/or IP keys. Both the blacklist rules and the whitelist rules may have the same format and configuration. However, as described above, the blacklist classifier 320 may determine to deny the network request when the one or more Non-IP keys and/or IP keys satisfy any one of the blacklist rules. On the other hand, the whitelist classifier 350 may determine to allow the network request when the one or more Non-IP keys and/or IP keys satisfy any one of the whitelist rules. In an embodiment, at least one of the blacklist rules and/or the whitelist rules may identify one or more acceptable/unacceptable values of one or more Non-IP keys and/or IP keys. In an embodiment, at least one of the blacklist rules and the whitelist rules may identify one or more acceptable/unacceptable ranges of one or more Non-IP keys and/or IP keys. In an embodiment, at least one of the blacklist rules and the whitelist rules may identify one or more acceptable/unacceptable groups or categories that the one or more Non-IP keys and/or IP keys may belong to. In an embodiment, at least one of the blacklist rules and the whitelist rules may identify an acceptable or unacceptable regular expression for the one or more Non-IP keys and/or IP keys. It should be noted that one or more embodiments described above may be combined in any single blacklist rule or whitelist rule.

Figure 5:
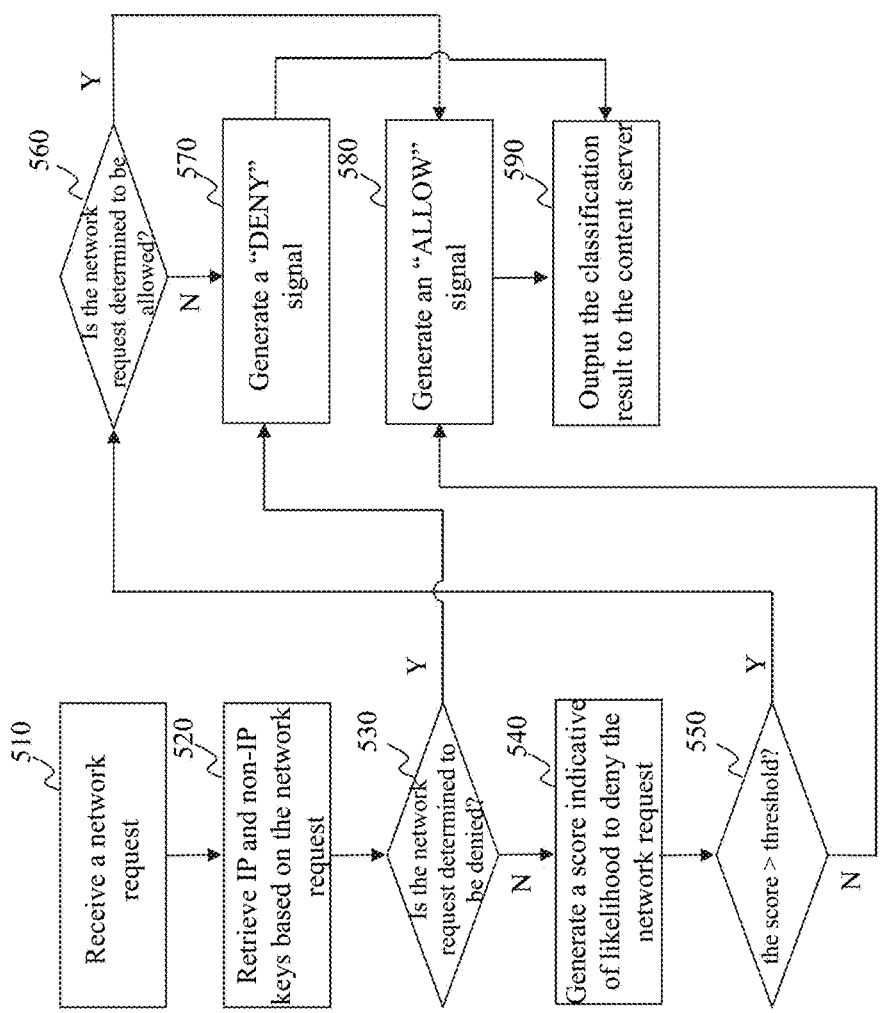
FIG. 5 is a flowchart of an exemplary process for generating a classification result in response to a network request, according to an embodiment of the present teaching.

FIG. 5 is a flowchart of an exemplary process for generating a classification result in response to a network request, according to an embodiment of the present teaching. In an embodiment, the exemplary process as shown in FIG. 5 may be performed by the traffic service request handler 104 in FIGS. 1-3.

At step 510, a network request is received from a client device 108 through the network 106. At step 520, one or more non-IP keys and/or IP keys associated with the network request are retrieved based on the network request. The one or more IP keys may include any IP address associated with the network request. For example, the one or more IP keys may include, but is not limited to, one or more selected from a peer IP address, a remote IP address, and a proxy IP address. The one or more non-IP keys may include any data item associated with the network request other than an IP address. For example, the one or more non-IP keys may include, but is not limited to, one or more selected from a uniform resource identifier (URI) key, a user key, a hypertext transfer protocol (HTTP) key, a location key, and a cookie key. As described above in FIG. 4, the URI key may be a URI path or a URI parameter. The user key may be a user identifier (ID) or a user attribute. The HTTP key may be a protocol type, a HTTP method, or a HTTP header. The location key may be indicative of a location of a source or a destination. The cookie key may be a b-cookie, a timestamp cookie, or a session cookie.

At step 530, it is determined whether the network request is to be denied according to the blacklist rules. Specifically, when the retrieved one or more IP keys and/or non-IP keys associated with the network request satisfy any one of the blacklist rules, it is determined that the network request is to be denied. Thus, the process proceeds to step 570, where a "DENY" signal is generated. Otherwise, the process proceeds to step 540. At step 540, a score indicative of likelihood to deny the network request is generated based on the model 306. At step 550, it is determined whether the score is greater than the threshold 357. If so, the process proceeds to step 560. Otherwise, the process proceeds to step 580, where an "ALLOW" signal is generated. At step 560, it is determined whether the network request is to be allowed according to the whitelist rules. Specifically, when the retrieved one or more IP keys and/or non-IP keys associated with the network request satisfy any one of the whitelist rules, it is determined that the network request is to be allowed. Thus, the process proceeds to step 580. Otherwise, the process proceeds to step 570. At step 590, the classification result (i.e., the "DENY" signal or the "ALLOW" signal) is outputted to the content server 116 as shown in FIGS. 1-2.

Figure 6:
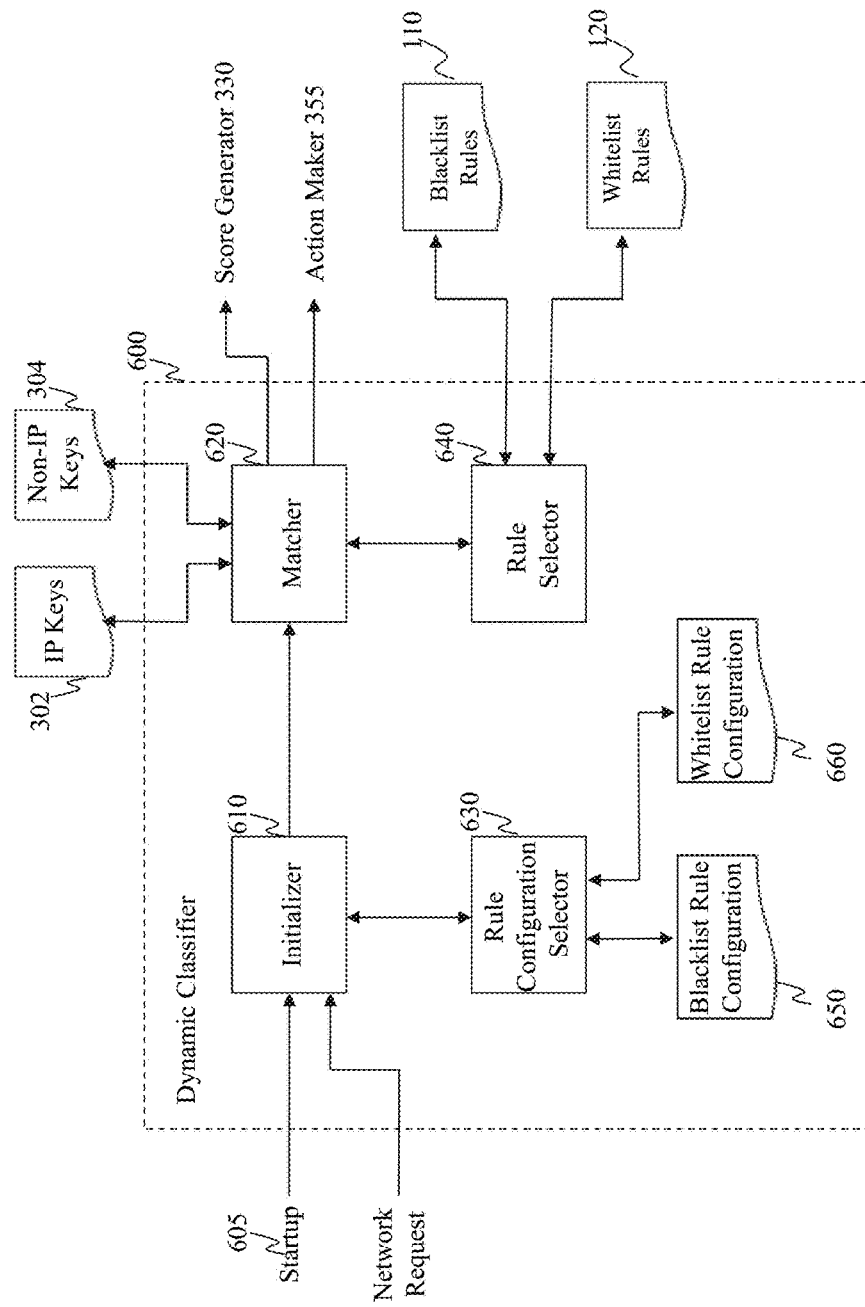
FIG. 6 illustrates an exemplary diagram of a dynamic classifier, according to an embodiment of the present teaching.

In an embodiment, both the blacklist classifier 320 and the whitelist classifier 350 may be implemented by a single dynamic classifier. FIG. 6 illustrates an exemplary diagram of a dynamic classifier 600, according to an embodiment of the present teaching. The dynamic classifier 600 may be configured to be either the blacklist classifier 320 or the whitelist classifier 350 as shown in FIG. 3 upon receipt of a startup signal. In this example, the dynamic classifier 600 includes an initializer 610, a rule configuration selector 630, a blacklist rule configuration file 650, a whitelist rule configuration file 660, a matcher 620, and a rule selector 640.

The initializer 610 receives a network request and a startup signal. The network request may be received from the client device 108 through the network 106. The startup signal may be generated by an external control unit (not shown). Upon receipt of the startup signal, the initializer 610 determines an application of the dynamic classifier based on the startup signal. For example, the startup signal may instruct to configure the dynamic classifier 600 to be the blacklist classifier 320. For another example, the startup signal may instruct to configure the dynamic classifier 600 to be the whitelist classifier 350.

The rule configuration selector 630 selects the appropriate rule configuration file according to the determined application. Specifically, the blacklist rule configuration file 650 may be selected when the dynamic classifier 600 is to be configured as the blacklist classifier 320. Alternatively, the whitelist rule configuration file 660 may be selected when the dynamic classifier 600 is to be configured as the whitelist classifier 350. Table 1 is an example rule configuration file, which may be either a blacklist rule configuration file 650 or a whitelist rule configuration file 660 depending on the "type" value in line 3 of table 1. As shown in table 1, the example rule configuration file further identifies the master data service (MDS) server, the port and file used to download the blacklist rules or whitelist rules.

TABLE 1

| An example rule configuration file |
| --- |
| 1  "genericClassifier":{ |
| 2    "enabled":true, |
| 3    "type": "blacklist"\"whitelist", |
| 4    "mdsHost": "mds.blackbird.ah.yahoo.com", |
| 5    "mdsPort": 4080, |
| 6    "mdsFile": "Blackbird/MDS/V1/Download/GenericClassifier/1.1" |
| 7    "pluginname": "GenericClassifier", |
| 8    "version": "1.0.0" |
| 9  } |

Upon selection of the appropriate rule configuration file (i.e., the blacklist rule configuration file 650 or the whitelist rule configuration file 660), the initializer 610 initializes the dynamic classifier 600 by launching the selected rule configuration file. The initializer further instructs the rule selector 640 through the matcher 620 to retrieve the appropriate rules (i.e., the blacklist rules 110 or whitelist rules 120) according to the application of the dynamic classifier 600.

The match 620 determines whether the one or more IP keys 302 and/or non-IP keys 304 associated with the network request satisfy any one of the rules (i.e., the blacklist rule 110 or the whitelist rule 120). If the dynamic classifier 600 is configured to be the blacklist classifier 320 and at least one of the blacklist rules 110 is satisfied, the matcher 620 outputs a "DENY" instruction to the action maker 355. If the dynamic classifier 600 is configured to be the whitelist classifier 350 and at least one of the whitelist rules 120 is satisfied, the matcher 620 outputs an "ALLOW" instruction to the action maker 355. If the dynamic classifier 600 is configured to be the blacklist classifier 320 and none of the blacklist rules 110 is satisfied, the matcher 620 outputs an instruction to compute a score to the score generator 330. If the dynamic classifier 600 is configured to be the whitelist classifier 350 and none of the whitelist rules 120 is satisfied, the matcher 620 outputs a "DENY" instruction to the action maker 355.

Figure 7:
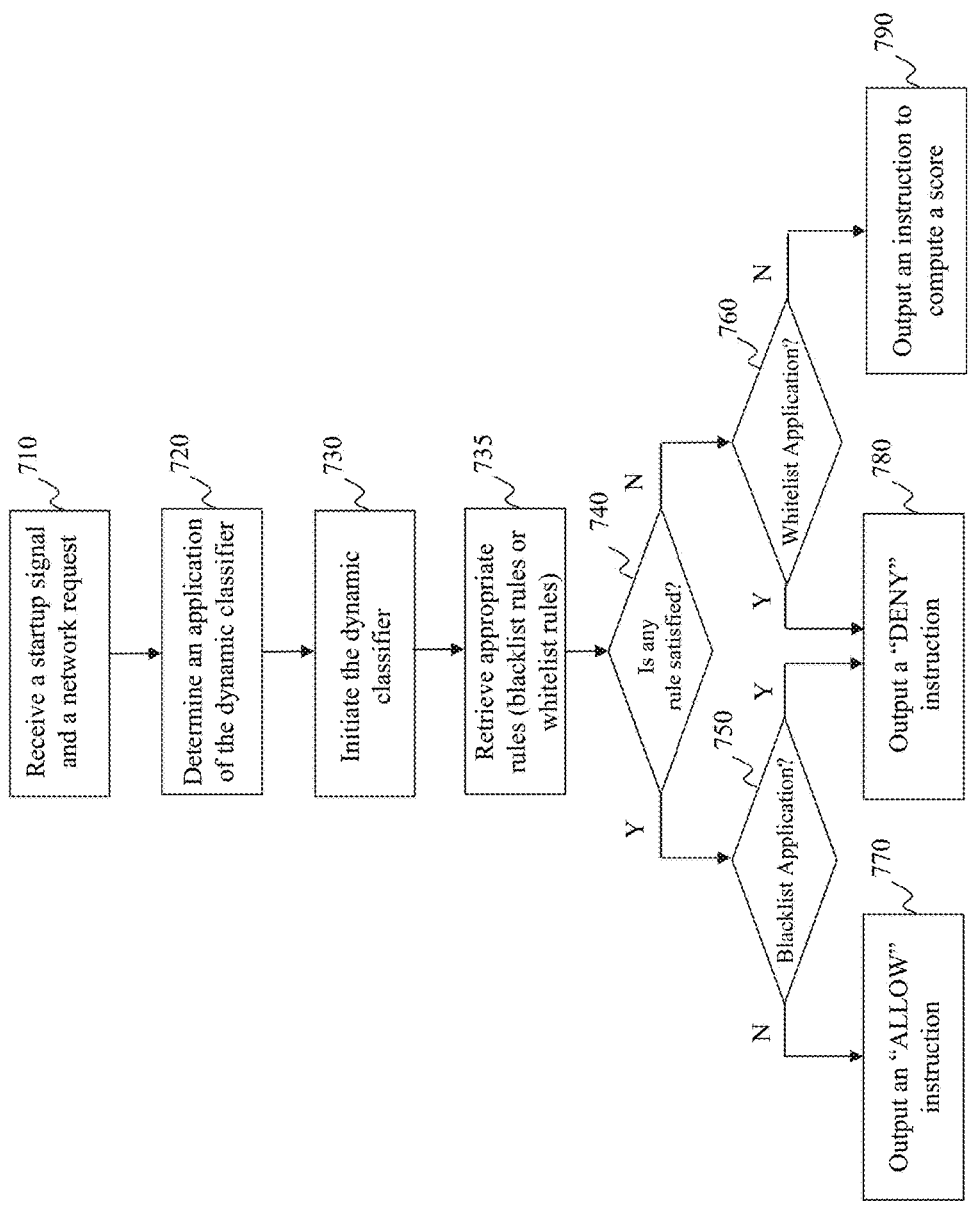
FIG. 7 is a flowchart of an exemplary process for configuring a dynamic classifier as a blacklist classifier or a whitelist classifier, according to an embodiment of the present teaching.

FIG. 7 is a flowchart of an exemplary process for configuring a dynamic classifier 600 to be a blacklist classifier 320 or a whitelist classifier 350, according to an embodiment of the present teaching. In an embodiment, the exemplary process as shown in FIG. 7 may be performed by the dynamic classifier 600 as shown in FIG. 6.

At step 710, a network request and a startup signal are received. The network request may be received from the client device 108 through the network 106. The startup signal may be generated by an external control unit (not shown). At step 720, an application of the dynamic classifier is determined based on the startup signal. For example, the startup signal may instruct to configure the dynamic classifier 600 to be the blacklist classifier 320. For another example, the startup signal may instruct to configure the dynamic classifier 600 to be the whitelist classifier 350. At step 730, the dynamic classifier 600 is initiated by selecting and launching the appropriate rule configuration according to the determined application. Specifically, the blacklist rule configuration file 650 may be selected and launched when the dynamic classifier 600 is to be configured as the blacklist classifier 320. Alternatively, the whitelist rule configuration file 660 may be selected and launched when the dynamic classifier 600 is to be configured as the whitelist classifier 350.

At step 735, the appropriate rules (i.e., the blacklist rules 110 or whitelist rules 120) are retrieved according to the application of the dynamic classifier 600. At step 740, it is determined whether the one or more IP keys 302 and/or non-IP keys 304 satisfy any one of the rules (i.e., the blacklist rule 110 or the whitelist rule 120). If so, the process proceeds to step 750. Otherwise, the process proceeds to step 760. At step 750, it is determined whether the dynamic classifier 600 is configured to be the blacklist classifier 220. If so, the process proceeds to step 780, where a "DENY" instruction is outputted, for example, to the action maker 355 in FIG. 3. Otherwise, the process proceeds to step 770, where an "ALLOW" instruction is outputted, for example, to the action maker 355. At step 760, it is determined whether the dynamic classifier 600 is configured to be the whitelist classifier 250. If so, the process proceeds to step 780, where the "DENY" instruction is outputted. Otherwise, the process proceeds to step 790, where an instruction to compute a score is outputted, for example, to the score generator 330 as shown in FIG. 3.

Figure 8:
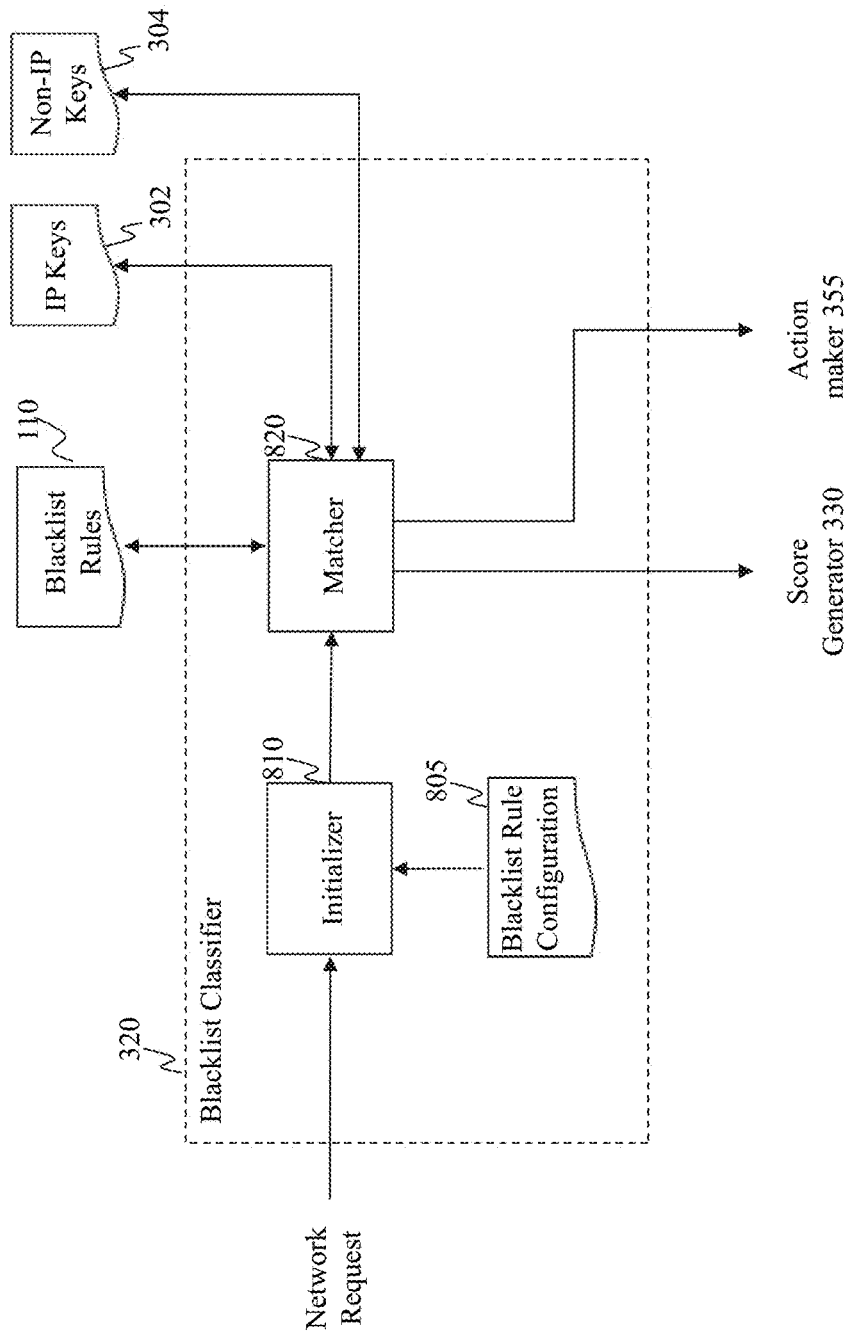
FIG. 8 illustrates an exemplary diagram of a blacklist classifier, according to an embodiment of the present teaching.
Figure 10:
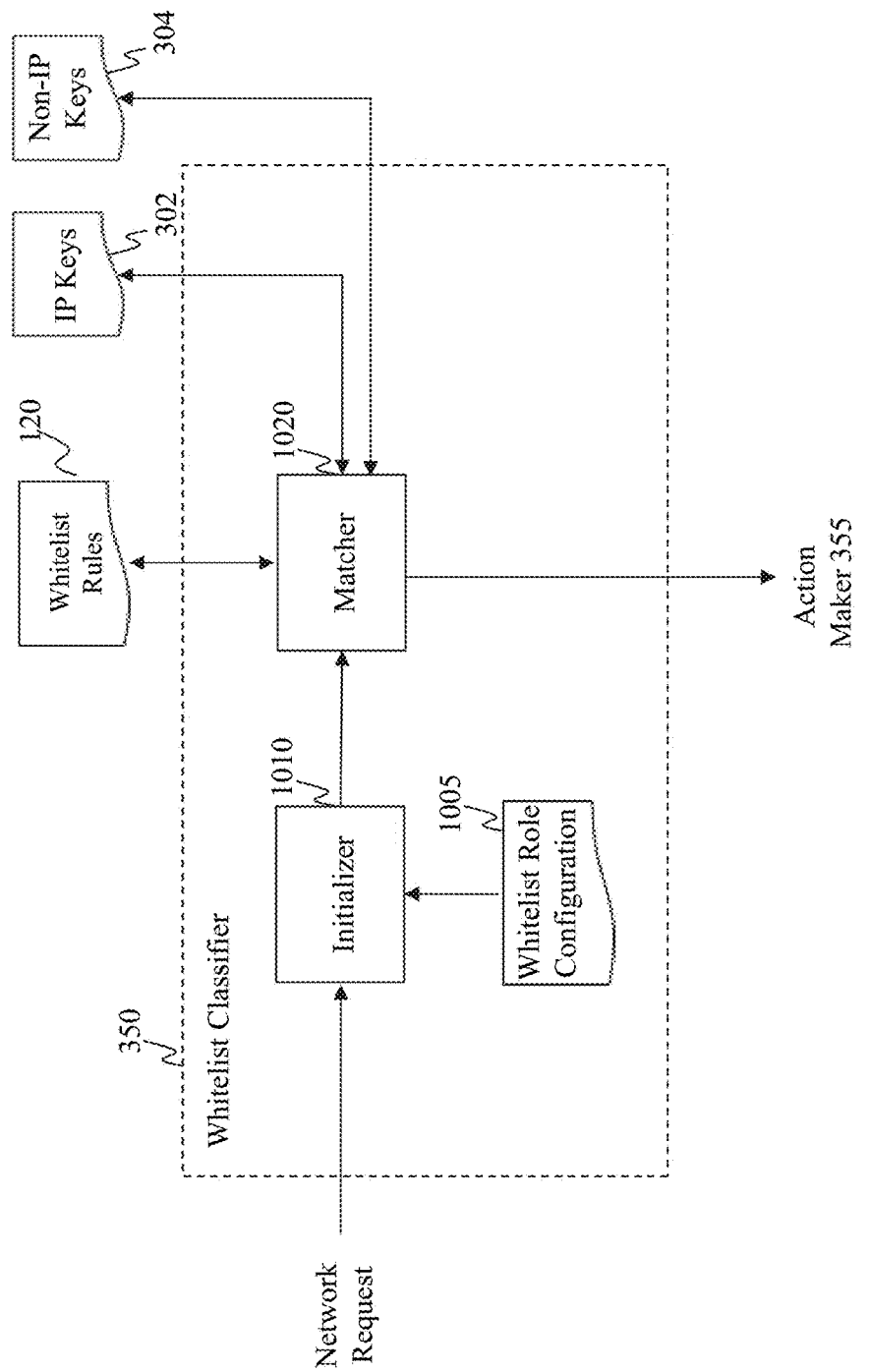
FIG. 10 illustrates an exemplary diagram of a whitelist classifier, according to an embodiment of the present teaching.

In an embodiment, both the blacklist classifier 320 and the whitelist classifier 350 may be implemented as separate standalone components as shown in FIGS. 8 and 10, respectively. FIG. 8 illustrates an exemplary diagram of the blacklist classifier 320, according to an embodiment of the present teaching. In this example, the blacklist classifier 320 includes an initializer 810, a blacklist rule configuration file 805, and a matcher 820.

The initializer 810 receives a network request, for example, from the client device 108 through the network 106. The initializer 810 further initiates the blacklist classifier 320 by launching the blacklist rule configuration file 805. In an embodiment, the blacklist rule configuration file 805 may be similar to the example rule configurable configuration file when the "type" value is equal to "blacklist" as shown in table 1.

The matcher 820 retrieves the blacklist rules 110, the one or more IP keys 302 and/or non-IP keys 304. The matcher 820 further determines whether the one or more IP keys 302 and/or non-IP keys 304 associated with the network request satisfy any one of the blacklist rules 110. If so, the matcher 820 outputs a "DENY" instruction, for example, to the action maker 355 in FIG. 3. Otherwise, the matcher 820 outputs an instruction to compute a score, for example, to the score generator 330 as shown in FIG. 3.

Figure 9:
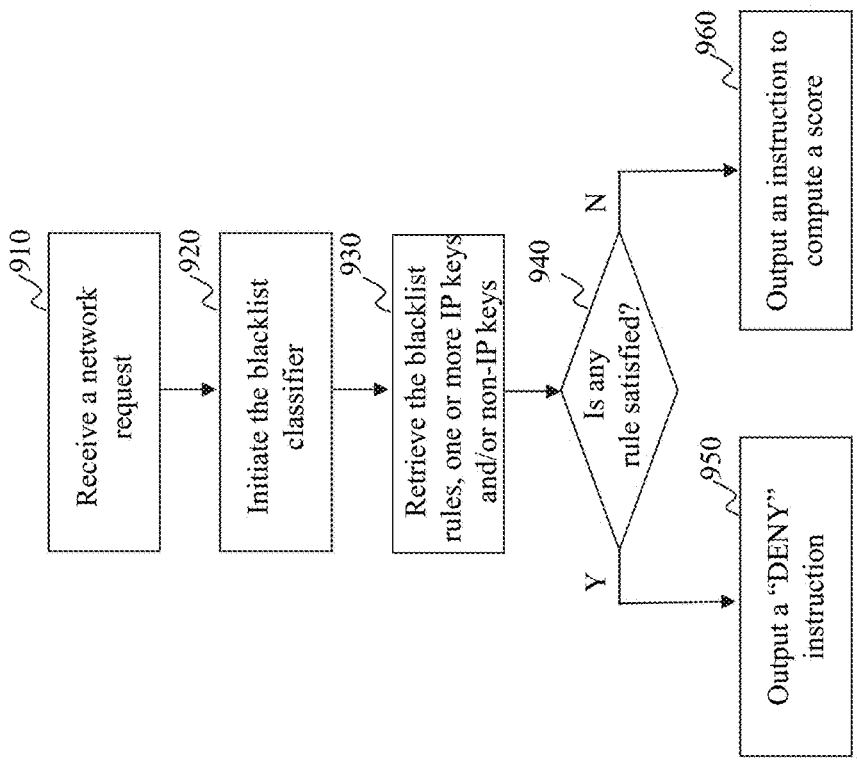
FIG. 9 is a flowchart of an exemplary process for classifying a network request using a blacklist classifier, according to an embodiment of the present teaching.

FIG. 9 is a flowchart of an exemplary process for classifying a network request using a blacklist classifier 320, according to an embodiment of the present teaching. In an embodiment, the exemplary process as shown in FIG. 9 may be performed by the blacklist classifier 320 as shown in FIG. 8.

At step 910, a network request in received, for example, from the client device 108 through the network 106. At step 920, the blacklist classifier 320 is initiated by launching the blacklist rule configuration file 805. In an embodiment, the blacklist rule configuration file 805 may be similar to the example rule configurable configuration file when the "type" value is equal to "blacklist" as shown in table 1. At step 930, the blacklist rules 110, the one or more IP keys and/or non-IP keys are retrieved.

At step 940, it is determined whether the one or more IP keys 302 and/or non-IP keys 304 associated with the network request satisfy any one of the blacklist rules. If so, the process proceeds to step 950. Otherwise, the process proceeds to step 960. At step 950, a "DENY" instruction is outputted, for example, to the action maker 355 in FIG. 3. At step 960, an instruction to compute a score is outputted, for example, to the score generator 330 as shown in FIG. 3.

FIG. 10 illustrates an exemplary diagram of the whitelist classifier 350, according to an embodiment of the present teaching. In this example, the whitelist classifier 350 includes an initializer 1010, a whitelist rule configuration file 1005, and a matcher 1020.

The initializer 1010 receives a network request, for example, from the client device 108 through the network 106. The initializer 1010 further initiates the whitelist classifier 350 by launching the whitelist rule configuration file 1005. In an embodiment, the whitelist rule configuration file 1005 may be similar to the example rule configurable configuration file when the "type" value is equal to "whitelist" as shown in table 1.

The matcher 1020 retrieves the whitelist rules 120, the one or more IP keys 302 and/or non-IP keys 304. The matcher 1020 further determines whether the one or more IP keys 302 and/or non-IP keys 304 associated with the network request satisfy any one of the whitelist rules 120. If so, the matcher 1020 outputs an "ALLOW" instruction, for example, to the action maker 355 in FIG. 3. Otherwise, the matcher 1020 outputs a "DENY" instruction, for example, to the action maker 355 in FIG. 3.

Figure 11:
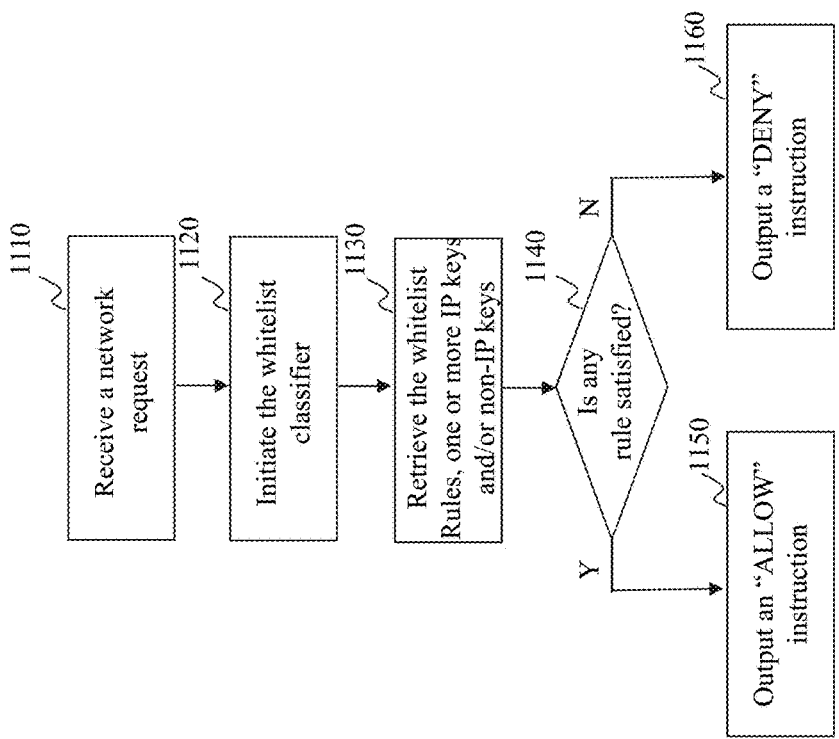
FIG. 11 is a flowchart of an exemplary process for classifying a network request using a whitelist classifier, according to an embodiment of the present teaching.

FIG. 11 is a flowchart of an exemplary process for classifying a network request using a whitelist classifier 350, according to an embodiment of the present teaching. In an embodiment, the exemplary process as shown in FIG. 11 may be performed by the whitelist classifier 350 as shown in FIG. 10.

At step 1110, a network request is received, for example, from the client device 108 through the network 106. At step 1120, the whitelist classifier 350 is initiated by launching the whitelist rule configuration file 1005. In an embodiment, the whitelist rule configuration file 1005 may be similar to the example rule configurable configuration file when the "type" value is equal to "whitelist" as shown in table 1. At step 1130, the whitelist rules 120, the one or more IP keys 302 and/or non-IP keys 304 are retrieved.

At step 1140, it is determined whether the IP keys 302 and/or non-IP keys 304 associated with the network request satisfy any one of the whitelist rules 120. If so, the process proceeds to step 1150. Otherwise, the process proceeds to step 1160. At step 1150, an "ALLOW" instruction is outputted, for example, to the action maker 355 in FIG. 3. At step 1160, a "DENY" instruction is outputted, for example, to the action maker 355 in FIG. 3.

Figure 12:
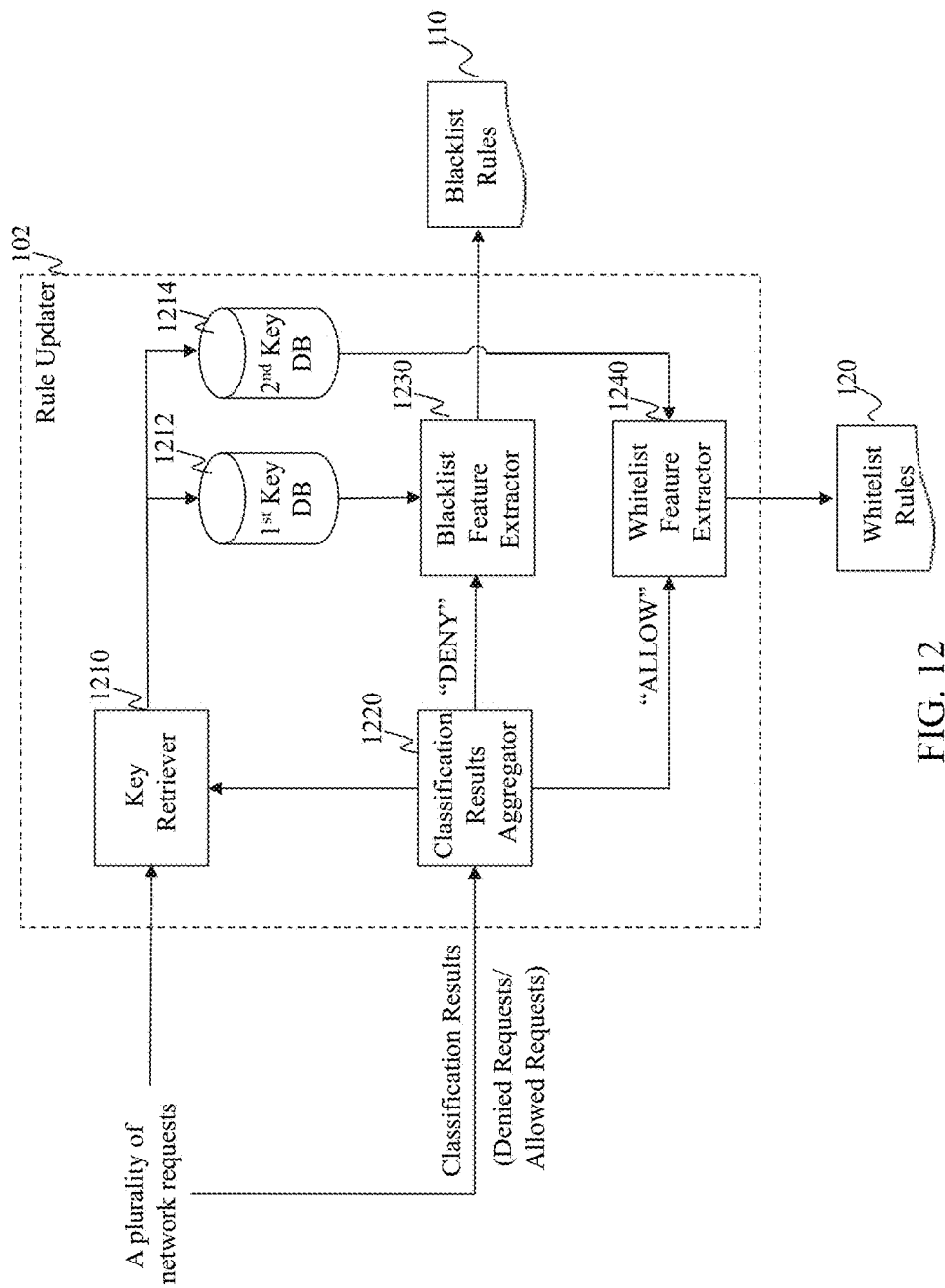
FIG. 12 illustrates an exemplary diagram of a rule updater, according to an embodiment of the present teaching.

FIG. 12 illustrates an exemplary diagram of a rule updater 102, according to an embodiment of the present teaching. In this example, the rule updater 102 includes a key retriever 1210, a classification results aggregator 1220, a first key database 1212, a second key database 1214, a blacklist feature extractor 1230, and a whitelist feature extractor 1240. It should be noted that in some other examples, the functions of the rule updater 102 may be performed by one or more human beings, for example, network administrators.

The key retriever 1210 retrieves a plurality of network requests from the client device 108 through the network 106. For each network request, the key retriever 1210 retrieves one or more IP keys and non-IP keys associated with the network request. The classification result aggregator may extract a predetermined classification result for each of the plurality of network requests. In an embodiment, the predetermined classification result (i.e., a denied request or an allowed request) for each network request is determined by one or more human beings, e.g., network administrators. When the network request is the denied request, the key retriever 1220 further stores the one or more IP keys and non-IP keys associated with the denied network request in the first key database 1212. Then the blacklist feature extractor 1230 extracts the common features with respect to the one or more IP keys and non-IP keys stored in the first key database 1212. Finally, the blacklist feature extractor 1230 updates the blacklist rules 110 with the extracted common features with respect to the first key database 1212.

When the network request is the allowed request, the key retriever 1220 further stores the one or more IP keys and non-IP keys associated with the denied network request in the second key database 1214. Then the whitelist feature extractor 1240 extracts the common features with respect to the one or more IP keys and non-IP keys stored in the second key database 1214. Finally, the whitelist feature extractor 1230 updates the whitelist rules 120 with the extracted common features with respect to the second key database 1214.

Figure 13:
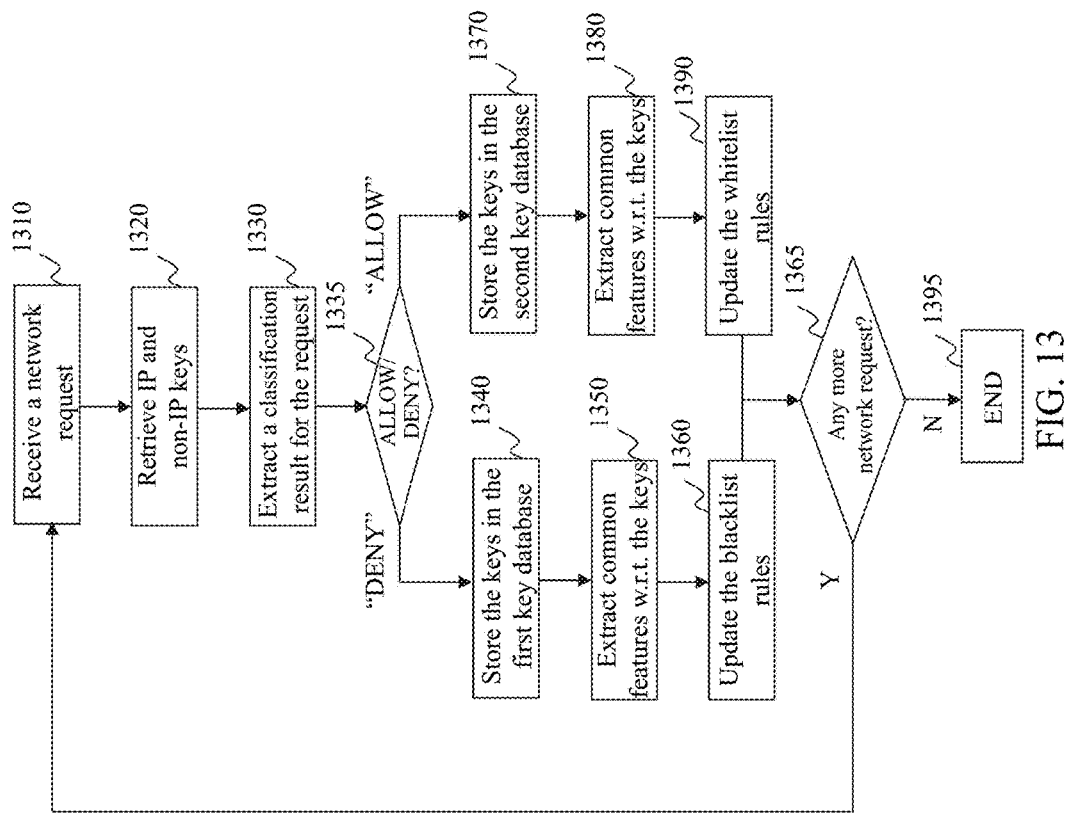
FIG. 13 is a flowchart of an exemplary process for updating blacklist rules and whitelist rules, according to an embodiment of the present teaching.

FIG. 13 is a flowchart of an exemplary process for updating blacklist rules 110 and whitelist rules 120, according to an embodiment of the present teaching. In an embodiment, the exemplary process as shown in FIG. 13 may be performed by the rule updater 102 as shown in FIG. 12. In another embodiment, the exemplary process as shown in FIG. 13 may be performed by one or more human beings, for example, network administrators.

At step 1310, a network request is received from the client device 108 through the network 106. At step 1320, one or more IP keys and non-IP keys associated with the network request are retrieved. At step 1330, a predetermined classification result for the network request is extracted. In an embodiment, the predetermined classification result (i.e., a denied request or an allowed request) is determined by one or more human beings, e.g., network administrators.

At step 1335, it is determined whether the network request is the denied request or the allowed request based on the extracted classification result. If the network request is the denied request, the process proceeds to step 1340. Otherwise, the process proceeds to step 1370. At step 1340, the one or more IP keys and non-IP keys associated with the denied network request are stored in the first key database 1212. At step 1350, the common features with respect to the one or more IP keys and non-IP keys stored in the first key database 1212 are extracted. At step 1360, the blacklist rules 110 are updated with the extracted common features from step 1350. On the other hand, at step 1370, the one or more IP keys and non-IP keys associated with the allowed network request are stored in the second key database 1214. At step 1380, the common features with respect to the one or more IP keys and non-IP keys stored in the second key database 1214 are extracted. At step 1390, the whitelist rules 120 are updated with the extracted common features from step 1380.

At step 1365, it is determined whether there is any more network request. If so, the process proceeds back to step 1310. Otherwise, the process ends at step 1395.

Figure 14:
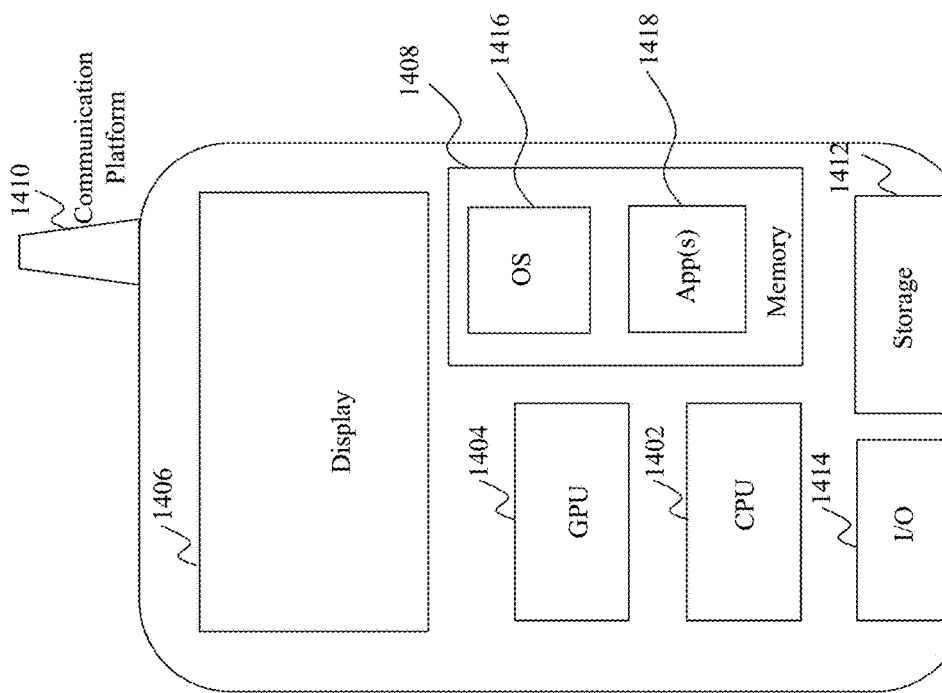
FIG. 14 depicts a general mobile device architecture on which the present teaching can be implemented.

FIG. 14 depicts a general mobile device architecture on which the present teaching can be implemented. In this example, the client device 108 is a mobile device 1400, including but is not limited to, a smart phone, a tablet, a music player, a handled gaming console, a GPS receiver. The mobile device 1400 in this example includes one or more central processing units (CPUs) 1402, one or more graphic processing units (GPUs) 1404, a display 1406, a memory 1408, a communication platform 1410, such as a wireless communication module, storage 1412, and one or more input/output (I/O) devices 1414. Any other suitable component, such as but not limited to a system bus or a controller (not shown), may also be included in the mobile device 1400. As shown in FIG. 14, a mobile operating system 1416, e.g., iOS, Android, Windows Phone, etc., and one or more applications 1418 may be loaded into the memory 1408 from the storage 1412 in order to be executed by the CPU 1402. The applications 1418 may include a web browser or any other suitable mobile apps. Execution of the applications 1418 may cause the mobile device 1400 to perform some processing as described before. For example, the display of the requested content is made by the GPU 1404 in conjunction with the display 1406. User inputs are received via the I/O devices 1414 and sent via the communication platform 1410.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 15:
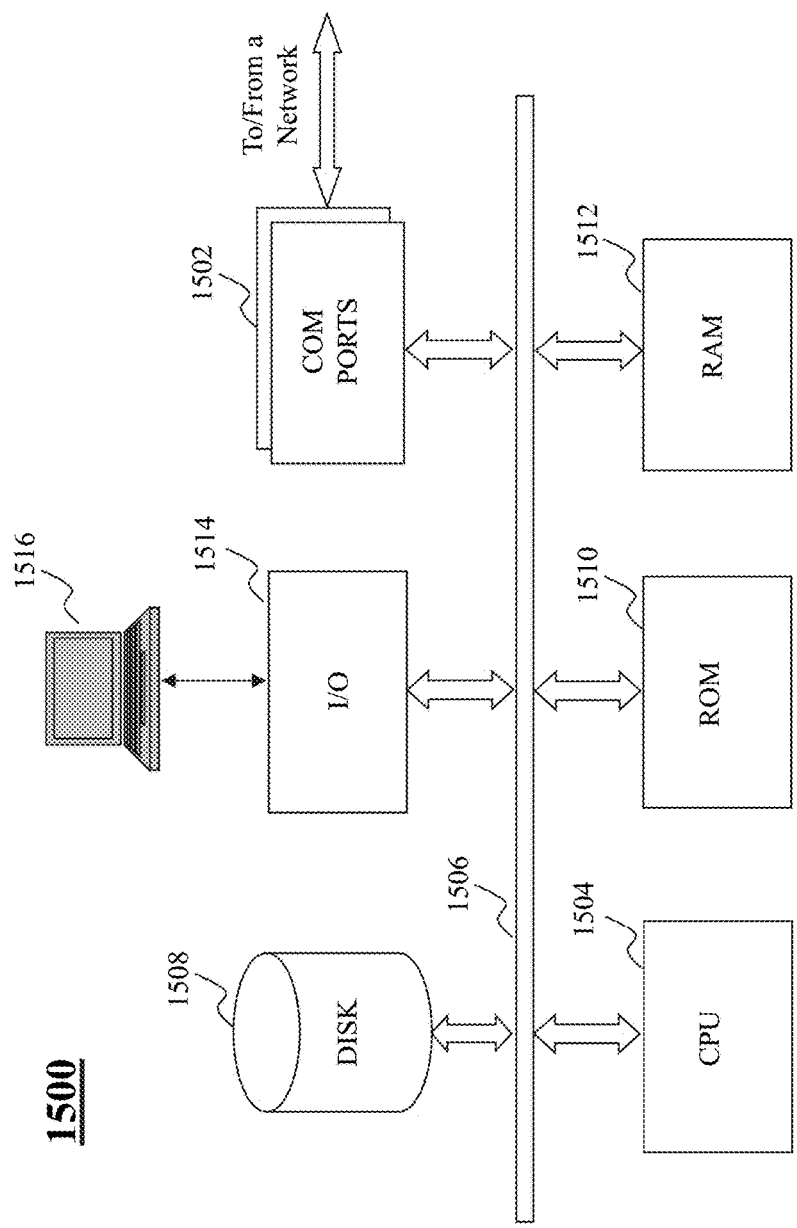
FIG. 15 depicts a general computer architecture on which the present teaching can be implemented.

FIG. 15 depicts a general computer architecture on which the present teaching can be implemented and has a functional block diagram illustration of a computer hardware platform that includes user interface elements. The computer 1500 may be a general-purpose computer or a special purpose computer. This computer 1500 can be used to implement any components of the system as described herein. Different components of the system, e.g., the client device 108, the rule updater 102, the traffic service request handler 104, and the content server 116 as depicted in FIGS. 1-2, can all be implemented on one or more computers such as computer 1500, via its hardware, software program, firmware, or a combination thereof. Although only one such computer is shown, for convenience, the computer functions may be implemented in a distributed fashion on a number of similar platforms, to distribute the processing load.

The computer 1500, for example, includes COM ports 1502 connected to and from a network connected thereto to facilitate data communications. The computer 1500 also includes a CPU 1504, in the form of one or more processors, for executing program instructions. The exemplary computer platform includes an internal communication bus 1506, program storage and data storage of different forms, e.g., disk 1508, read only memory (ROM) 1510, or random access memory (RAM) 1512, for various data files to be processed and/or communicated by the computer, as well as possibly program instructions to be executed by the CPU 1504. The computer 1500 also includes an I/O component 1514, supporting input/output flows between the computer and other components therein such as user interface elements 1516. The computer 1500 may also receive programming and data via network communications.

Hence, aspects of the method of classifying network requests, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each of which having at least one processor, storage, and a communication platform connected to a network for classifying network requests, the method comprising:
   receiving, from a client device, a network request for content to be fetched by a content server;
   obtaining at least one non-internet protocol (IP) key based on the network request;
   determining whether to deny the network request based on the at least one non-IP key satisfying a blacklist rule;
   computing, in response to the blacklist rule being unsatisfied, a score indicative of a likelihood of denying the network request; and
   transmitting content to the client device based on the score satisfying a criterion.

2. The method of claim 1, wherein the at least one non-IP key comprises one or more selected from a uniform resource identifier (URI) key, a user key, a hypertext transfer protocol (HTTP) key, a location key, and a cookie key.

3. The method of claim 2, wherein the URI key is a URI path or a URI parameter, wherein the user key is a user identifier (ID) or a user attribute, wherein the HTTP key is a protocol type, a HTTP method, or a HTTP header, wherein the location key is indicative of a location of a source or a destination, and wherein the cookie key is ab-cookie, a timestamp cookie, or a session cookie.

4. The method of claim 1, further comprising obtaining at least one IP key based on the network request, and wherein the step of determining whether to deny the network request is based on the at least one IP key and the at least one non-IP key.

5. The method of claim 4, wherein the at least one IP key comprises one or more selected from a peer IP address, a remote IP address, and a proxy IP address.

6. The method of claim 1, wherein the step of determining to deny the network request is implemented upon receipt of a startup signal at runtime configuration.

7. A system having at least one processor, storage, and a communication platform connected to a network for classifying network requests, the system comprising:
   an initializer implemented by the at least one processor and configured to receive, from a client device, a network request for content to be fetched by a content server; and
   a matcher implemented by the at least one processor and configured to:

obtain at least one non-internet protocol (IP) key based on the network request;
determine whether to deny the network request based on the at least one non-IP key satisfying a blacklist rule;
compute, in response to the blacklist rule being unsatisfied, a score indicative of a likelihood of denying the network request; and
transmit content to the client device based on the score satisfying a criterion.

8. The system of claim 7, wherein the at least one non-IP key comprises one or more selected from a uniform resource identifier (URI) key, a user key, a hypertext transfer protocol (HTTP) key, a location key, and a cookie key.

9. The system of claim 8, wherein the URI key is a URI path or a URI parameter, wherein the user key is a user identifier (ID) or a user attribute, wherein the HTTP key is a protocol type, a HTTP method, or a HTTP header, wherein the location key is indicative of a location of a source or a destination, and wherein the cookie key is ab-cookie, a timestamp cookie, or a session cookie.

10. The system of claim 7, wherein the matcher is further configured to obtain at least one IP key based on the network request, and wherein whether to deny the network request is determined based on the at least one IP key and the at least one non-IP key.

11. The system of claim 10, wherein the at least one IP key comprises one or more selected from a peer IP address, a remote IP address, and a proxy IP address.

12. The system of claim 7, wherein whether the matcher is to deny the network request is implemented upon receipt of a startup signal at runtime configuration.

13. A non-transitory machine-readable medium having information recorded thereon for classifying network requests, wherein the information, when read by the machine, causes the machine to perform following:
receiving, from a client device, a network request for content to be fetched by a content server;
obtaining at least one non-internet protocol (IP) key based on the network request;
determining whether to deny the network request based on the at least one non-IP key satisfying a blacklist rule;
computing, in response to the blacklist rule being unsatisfied, a score indicative of a likelihood of denying the network request; and
transmitting content to the client device based on the score satisfying a criterion.

14. The medium of claim 13, wherein the at least one non-IP key comprises one or more selected from a uniform resource identifier (URI) key, a user key, a hypertext transfer protocol (HTTP) key, a location key, and a cookie key.

15. The medium of claim 14, wherein the URI key is a URI path or a URI parameter, wherein the user key is a user identifier (ID) or a user attribute, wherein the HTTP key is a protocol type, a HTTP method, or a HTTP header, wherein the location key is indicative of a location of a source or a destination, and wherein the cookie key is ab-cookie, a timestamp cookie, or a session cookie.

16. The medium of claim 13, wherein the information, when read by the machine, further causes the machine to obtain at least one IP key based on the network request, and wherein whether to deny the network request is based on the at least one IP key and the at least one non-IP key.

17. The medium of claim 16, wherein the at least one IP key comprises one or more selected from a peer IP address, a remote IP address, and a proxy IP address.

18. The medium of claim 13, wherein to deny the network request is implemented upon receipt of a startup signal at runtime configuration.

* * * * *